Figure 1:
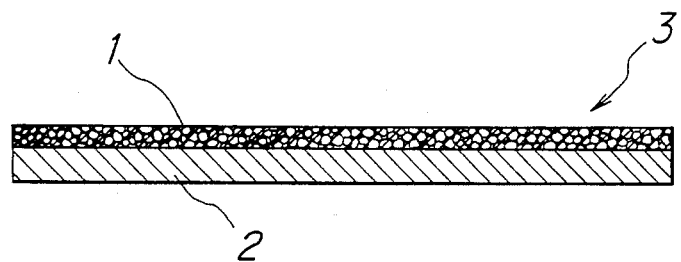

United States Patent [19]
Yamada et al.

[11] Patent Number: 4,505,987
[45] Date of Patent: Mar. 19, 1985

[54] SLIDING MEMBER

[75] Inventors: Shinji Yamada, Fujisawa; Saburo Hanafusa, Ohmiya, both of Japan

[73] Assignees: Oiles Industry Co., Ltd.; Mitsuya Seiko Co. Ltd., both of Japan

[21] Appl. No.: 320,124

[22] Filed: Nov. 10, 1981

[51] Int. Cl.$^3$ ............... B22F 7/04; C22C 9/06
[52] U.S. Cl. .................. 428/553; 75/230; 75/247; 419/9; 419/10; 420/472; 420/473
[58] Field of Search ............ 420/470, 472, 473; 428/553; 75/230, 243, 247; 419/5, 6, 7, 11, 9, 10

[56] References Cited

U.S. PATENT DOCUMENTS

| | | | |
|---|---|---|---|
| 1,834,746 | 12/1931 | Short. | |
| 2,105,945 | 1/1938 | Hull | 420/473 |
| 2,178,529 | 10/1939 | Calkins et al. | 29/149.5 |
| 2,289,658 | 7/1942 | Koehring | 428/553 |
| 3,453,103 | 7/1969 | Tracey | 75/231 |
| 4,274,874 | 6/1981 | Obara et al. | 75/231 |
| 4,435,482 | 3/1984 | Futamura et al. | 75/244 |

FOREIGN PATENT DOCUMENTS

| | | | |
|---|---|---|---|
| 623895 | 7/1961 | Canada | 75/247 |
| 48-20963 | 6/1973 | Japan | 420/473 |
| 4885604 | 6/1980 | Japan. | |
| 5612288 | of 1981 | Japan. | |
| 567347 | 10/1977 | U.S.S.R. | 75/243 |

Primary Examiner—Ben R. Padgett
Assistant Examiner—Anne Brookes
Attorney, Agent, or Firm—Cushman, Darby & Cushman

[57] ABSTRACT

A sliding member highly improved with lubricating performance, wear resistant property and strength has a thin steel sheet or plate and sintered metal layer deposited on the steel sheet, wherein the sintered metal layer, comprises copper as a main component incorporated with a certain amount of tin, nickel, phosphorus, graphite and, optionally, with iron, and a sliding member exhibiting excellent lubricating performance, wear resistant property and strength even under impact and heavy loads includes a thick steel sheet or plate with which thin steel sheet of the above-mentioned sliding member is integrally joined.

5 Claims, 2 Drawing Figures

SLIDING MEMBER

This invention concerns a sliding member having a sintered metal layer comprising copper as a main component, the sintered metal layer having at least 3% by weight of graphite as a lubricating substance dispersed therein, as well as a multi-layered sliding member having the above-mentioned sintered metal layer deposited on a steel sheet or plate. In this specification the sintered metal layer comprising copper as the main component is referred to as the sintered metal layer including not less than 36 percent by weight of copper.

Sliding members formed by depositing a sintered metal layer on a thin steel sheet or plate have been broadly employed, particularly, as a so-called roll type bushes by rolling the sliding member into a cylindrical or tubular configuration with the sintered metal layer on the inside.

The performance of the sliding member of this type is dependent on the lubricating property, the wear resistant property and the mechanical strength of the sintered metal sliding layer deposited on the steel sheet or plate, as well as the bondability thereof with the steel sheet or plate.

In view of the foregoings, various types of sliding members have hitherto been proposed but satisfactory sliding members have not yet been developed with respect to the sliding performance such as the lubricating property and the wear resistant property.

In addition, since the conventional sliding members of the type referred to above have the sliding layers secured on the thin steel sheets or plates, they are restricted only to narrow application uses and can not be used as they are to those situations where impact loads or heavy loads are exerted.

Accordingly, it is an object of this invention to provide a sliding member or a multi-layered sliding member improved with the lubricating property, the wear resistant property and the mechanical strength.

The object can be attained by a sliding member having a sintered metal layer comprising copper as a main component, 3 to 10% by weight of graphite, tin capable of forming an alloy with copper, more than 10% by weight of nickel and phosphorus and, particularly, by a multi-layered sliding member comprising a thin steel sheet or plate and a sintered metal layer secured on said thin steel sheet or plate, said sintered metal layer comprising 4 to 10% of tin, 10 to 40% of nickel, 0.5 to 4% of phosphorus, 3 to 10% of graphite and the balance of copper on the weight ratio.

Another object of this invention is to provide a multi-layered sliding member which has the improved lubricating property, the improved wear resistant property and the improved mechanical strength even under impact loads and heavy loads.

Said another object can be attained by a multi-layered sliding member in which one multi-layered steel plate is formed by securing, on a thin steel plate, a sintered metal layer comprising 4 to 10% of tin, 10 to 40% of nickel, 0.5 to 4% of phosphorus, 3 to 10% of graphite and the balance of copper on the weight ratio, and said one multi-layered steel plate is integrally joined or bonded to a further separate steel sheet or plate by way of a thin copper alloy sheet or plate.

Figure 2:
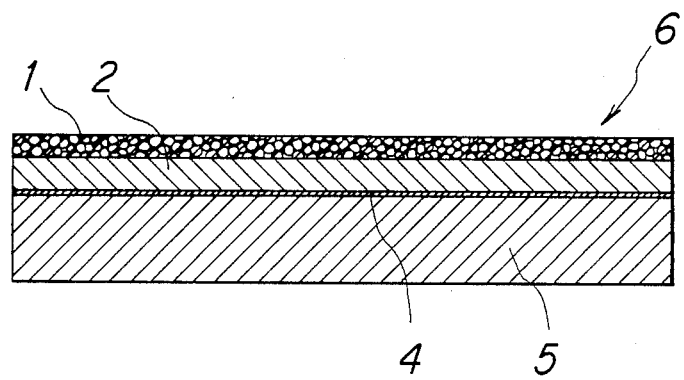

This invention is to be described in more details referring to the accompanying drawings, by which the foregoing and other objects, as well as the features of this invention will be made clearer in which;

FIG. 1 is a sectional side view of the first embodiment of the sliding member or the multi-layered sliding member according to this invention where particles of the components are diagrammatically illustrated; and FIG. 2 is a sectional side view of the second embodiment of the sliding member or the multi-layered sliding member according to this invention where particles of the components are diagrammatically illustrated.

In FIG. 1, a sintered metal layer 1 is secured on a thin steel sheet or plate 2, and the layer 1 and the plate 2 constitute a multi-layered sliding member 3.

The thin steel sheet or plate 2 means, herein, a steel plate of such reduced thickness that the sliding member 3 having the steel plate 2 may be deformed so as to form a cylindrical or tubular wall. The steel plate has a thickness usually of 1 to 3 mm.

The sintered metal layer 1 is constituted with copper alloys comprising copper as the main component, the sintered metal layer 1 having at least 3% by weight of graphite particles dispersed therein as the lubricating substance.

The sintered metal layer 1 is prepared by sintering, on a steel plate 2, the mixture of the powders comprising 4 to 10% by weight of tin powder, 10 to 40% by weight of nickel powder, 0.5 to 4.0% by weight of phosphorus powder, 3 to 10% by weight of graphite powder and the balance of copper powder, or the mixture of the powders comprising the foregoing components and further incorporated with less than 30% by weight of iron powder. Powder may be alloy powder.

The numerical values represented by percent by weight correspond herein to those of the percent by weight for each of the components relative to the weight of the sintered metal layer 1.

The sintered metal layer 1 includes not less than 36% by weight of copper.

The tin component in the composition contributes to the improvement in the strength of the basic structure of the sintered metal layer 1, the mechanical strength of the sintered metal layer 1 such as toughness as well as the wear resistant property thereof, being alloyed with copper as the main component to form bronze. The tin component also serves for making the sintered metal layer 1 porous in the alloy forming process.

If the tin content is less than 4% by weight, the foregoing improvements can not be obtained to render the mechanical strength and wear resistant property of the sintered metal layer insufficient. While on the other hand, if the tin content is more than 10% by weight, it gives adverse effects on the sintering property, and the sintered metal layer 1 becomes brittle.

Accordingly, tin component is contained, preferably, between 4 to 10% by weight. The particularly suitable range for tin to give the above-mentioned effects or advantages is between 5 to 8% by weight.

The nickel component which is included 10 to 40% by weight diffuses into copper as the main component, and contributes to the improvement in the wear resistant property of the sintered metal layer 1 and the improvement in the strength of the basic structure of the sintered metal layer 1. The amount of nickel content is determined considering the amount of tin content in which the amount of nickel content (% by weight) may be reduced as the amount of tin content (% by weight) is increased. If the nickel content is less than 10% by weight advantageous effects referred to above can not be sufficiently obtained. While on the other hand, if the nickel content is increased in excess of 40% by weight, no further improvement can be expected for the foregoing effects, only resulting in the cost increase. Thus, the nickel content is, preferably, not more than 40% by weight.

Furthermore, the nickel component has another feature of forming pores in the sintered body or the sintered metal layer 1, when at least a part of nickel diffuses into copper in the course of the sintering, to render the sintered body more porous.

Accordingly, the nickel content may also be determined on the basis of the content of graphite as a solid lubricant as detailed later. The sliding member 3 having the sintered metal layer 1 can be employed also as an oil-impregnated sliding member by impregnating the sintered metal layer 1 thus rendered porous with oils depending on the application uses.

The nickel component also serves for strengthening the close adhesion or joinder between the sintered metal layer 1 and the thin steel plate 2, because part of nickel diffuses into the steel plate 2 to form nickel-iron alloy at the interface of the sintered metal layer 1 and the steel plate 2 in the sintering process, and because, in the sintering process part of the nickel component is alloyed with phosphorus to form nickel-phosphorus alloy which has a strong affinity for the steel of the plate 2.

In view of the high cost of nickel, the nickel component may partially be substituted with iron. Although iron does not form a solid solution with copper as the main component, the iron component serves to improve the strength of the basic structure of the sintered metal layer 1, as the iron particles are dispersed among other metallic or alloyed particles in the sintered metal layer 1. The iron component contributes to the cost reduction by the partial replacement of expensive nickel with the iron.

However, the iron content should be determined carefully since iron, if contained in a large amount, impairs the effects derived from nickel.

It has been confirmed that the iron content within about 30% by weight does not impair the effects or advantages obtained by incorporating the nickel component.

The phosphorus component is partially alloyed with copper as the main component and with nickel to increase the strength of the basic structure and contribute to the improvement in the wear resistant property.

The phosphorus has a strong reducing power and serves to make the surface of the steel plate 2 clean by the reducing action, which results in the promotion or acceleration of the diffusion of nickel into the steel plate 2.

The phosphorus content is, suitably, between 0.5 to 4.0% by weight. If the phosphorus content is less than 0.5% by weight, there is fear that the above-mentioned effects or advantages are reduced. On the other hand, if the phosphorus content is more than 4.0% by weight, the sintered metal layer 1 may become brittle.

The content of the graphite component should not be less than 3% by weight in order to provide the sintered metal layer 1 with the self-lubricating property. However, if graphite content exceeds 10% by weight it incurs problems in view of the sintering property of the mixture of the component powders and in view of the bondability or joinder between the sintered metal layer 1 and the backing metal (thin steel plate) 2. Accordingly, the graphite content is, preferably, between 3 to 10% by weight. And more preferably the graphite content is in the range of 5 to 8% by weight.

As stated above, the sliding member 3 according to this invention always exhibits satisfactory sliding performance due to its sintered metal layer 1 comprising copper as the main component and incorporated with a certain amount of tin, nickel, phosphorus, graphite and, optionally, with a certain amount of iron.

Further, in the multi-layered sliding member 3 according to this invention, the mechanical strength of the sintered metal layer 1 can be improved by firmly bonding or joining the layer 1 onto the thin steel plate 2.

EXAMPLE 1

Explanation is made referring to an example of the production process for a multi-layered sliding member 3 in which a sintered mtal layer 1 comprising the composition for each of the components as mentioned above is secured on a thin steel plate 2, in the order of the production steps.

First Step

Mixed powders were obtained by mixing 8% by weight of atomized tin powder passing through 250 mesh, 28% by weight of nickel powder prepared through electrolysis and passing through 250 mesh, 7% by weight of phosphorus, copper alloy powder (phosphorus content of 14.5% by weight) passing through 120 mesh, 5% by weight of graphite powder passing through 150 mesh and the balance of copper powder prepared through electrolysis and passing through 150 mesh in a mixer for 10 minutes.

The mixed powders contained 58% by weight of copper, 8% by weight of tin, 28% by weight of nickel, 1% by weight of phosphorus and 5% by weight of graphite.

Second Step

The mixture of powders obtained in the first step was uniformly scattered in a 5.0 mm thickness over a steel plate (cold rolled carbon steel sheet and strip, JIS G3141 SPCC which corresponds to ASTM A109-72 of a 2.0 mm thickness as the thin steel plate 2 which had previously been degreased with trichloroethylene for cleaning and was sintered in a furnace kept under a reducing atmosphere at the temperature of 870° C. for 10 minutes (primary sintering). Thereafter, they were rolled under the high temperature and under the roll pressure to make the thickness of the sintered metal layer 1.5 mm.

Third Step

The steel plate 2 having the sintered metal layer 1 on one surface prepared in the second step was placed in a furnace and then sintered under a reducing atmosphere at the temperature of 800° C. for 10 minutes (secondary sintering) to increase interparticle bonding strength to thereby prepare a multi-layered sliding member 3 in which the sintered metal sliding layer 1 was secured onto the steel plate 2.

The structure of the multi-layered sliding member 3 prepared through the foregoing steps is as shown in FIG. 1. The multi-layered sliding member 3 thus prepared can be used as a sliding member by being cut into predetermined dimensions or as a so-called roll type bush by being rolled into a cylindrical configuration with the sintered metal layer 1 placed on the inner side.

FIG. 2 shows a multi-layered sliding member 6 in which a sintered metal layer 1 similar to the sintered metal layer shown in FIG. 1 is secured on one surface of a thin steel sheet or plate 2, and a thick steel sheet or plate 5 is bonded or joined on the other surface of the thin steel plate 2 by way of a bonding or joining region comprising a phosphor bronze alloy plate 4.

The phosphor bronze plate 4 behaves herein as a bonding or joining material for integrally bonding the steel plates 2 and 5.

Instead of the thin phosphor bronze alloy plate 4, other copper alloy plates such as brass alloy plate may also be used for the bonding.

The thick steel sheet or plate 5 means herein a plate thick enough to be used in the form of the plate for the tongue rail floor plate and the wear plate for the press machine etc. The thickness of the plate 5 is usually between 10 to 50 mm but it may be greater than 50 mm or smaller than 10 mm depending on the application uses.

Since the multi-layered sliding member 6 shown in FIG. 2 is prepared by integrally bonding the multi-layered sliding member 3 shown in FIG. 1 to a separate thick steel plate 5, the pressure-resistant strength of the sintered metal layer 1 is improved and the material 6 can be used even under impact load and heavy loads.

It is thus particularly suitable for use in sliding parts placed under impact loads or heavy loads, for example, tongue rail floor plates in the point mechanism of rail ways and wear plates in press machines. The sliding member 6 can also be used as oil-impregnated members depending on the application uses in the similar manner to that of the sliding member 3.

EXAMPLE 2

This example demonstrates a production process for a multi-layered sliding member 6 with improved pressure resistant strength usable under impact loads or heavy loads by integrally bonding the multi-layered sliding member 3 obtained in Example 1 (FIG. 1) onto a separate thick steel plate 5.

The first through third steps in the production steps of Example 2 are the same as those in Example 1.

Fourth Step

The multi-layered sliding member 3 was prepared in the same procedures as in Example 1, and a steel plate 5 of 20 mm thickness (rolled steel for general structure, JIS G 310 SS41 which corresponds to ASTM A6-73) whose surface had been cleaned was also prepared separately.

A thin phosphor bronze alloy plate 4 of 0.1 mm thickness was placed on the steel plate 5 and the multi-layered sliding member 3 was overlapped on the steel plate 5 by way of the thin phosphor bronze plate 4.

Fifth Step

The multi-layered sliding member 3 and the thick steel member 5 overlapped to each other by way of the thin phosphor bronze plate 4 were pressurized, kept in a furnace under a inert gas atmosphere such as nitrogen gas and argon gas, heated to the temperature of 980° C. for 30 minutes and then cooled gradually to obtain the multi-layered sliding member 6 in which the steel plate 2 of the multi-layered sliding member 3 and the thick steel plate 5 were integrated by way of the thin phosphor bronze alloy plate 4 as a bonding or joining region.

The fifth step is the most important in Example 2, in which it is particularly necessary to take careful control for the heating temperature in the furnace upon bonding while using the thin phosphor bronze alloy plate 4 as the bonding material.

If the heating temperature is excessively high, the thin phosphor bronze alloy plate 4 as the bonding material tends to fuse to render the bonding insufficient and cause deformation in the sintered metal layer 1. Particularly, it was further confirmed important by the experiment that the bonding or joining step should be carried out at such a temperature where the α-phase and partial liquid phase of the phosphor bronze alloy 4 behaving as the bonding material coexist or are present together, that is, at the temperature of about 980° C.

Furthermore, bonding or joining of the multi-layered sliding member 3 and the thick steel plate 5 requires no flux as conventionally employed for the soldering, because the phosphorus component in the phosphor bronze alloy 4 that behaves or acts as the bonding material has a strong reducing power and cleans the surface of the steel plates 2, 5 to be bonded by way of such reduction, whereby the bonding strength is increased more.

The bonding obtained by the phosphor bronze alloy plate 4 exhibited bonding strength about 1.5 to 2.5 times as high as the bonding strength obtained by conventional soldering.

The multi-layered sliding member 6 obtained in Example 2 was subjected to abrasion test under the conditions of 300 kg/cm$^2$ of load, 15 m/min of sliding velocity and with no oil feeding. As the result, the sliding member had satisfactory sliding performance during the test period, and the wear amount measured after 20 hours was as low as 0.04 mm.

The multi-layered sliding member 6 obtained in Example 2 was impregnated with oils, by which 7% by volume of oils were contained in the sintered metal layer 1, assuming the apparent volume of the sintered metal layer 1 to be 100%.

Further, when the multi-layered sliding member 6 having the oil-impregnated sintered metal layer was subjected to the foregoing abrasion test, the wear amount in the sliding member 6 was almost zero.

What is claimed is:

1. A multi-layered sliding member comprising a thin steel plate and a sintered metal layer secured on said thin steel plate, in which said sintered metal layer comprises 4 to 10 wt% of tin, 10 to 40 wt% of nickel, 0.5 to 4 wt% of phosphorus, 3 to 10 wt% of graphite and at least 36 wt% of copper.

2. The multi-layered sliding member of claim 1, in which the sintered metal layer contains not more than 30 wt% of iron.

3. A multi-layered sliding member, in which one multi-layered steel plate is formed by securing, on a thin steel plate, a sintered metal layer comprising 4 to 10 wt% of tin, 10 to 40 wt% of nickel, 0.5 to 4 wt% of phosphorus, 3 to 10 wt% of graphite and at least 36 wt% of copper, and said one multi-layered steel plate is integrally joined with a further steel plate by way of a thin copper alloy plate.

4. The multi-layered sliding member of claim 3, in which the sintered metal layer contains not more than 30 wt% of iron.

5. A multi-layered sliding member comprising a thin steel plate and a sintered metal layer secured on said thin steel plate, said sintered metal layer consisting essentially of 4 to 10% by weight of tin, 10 to 40% by weight of nickel, 0.5 to 4% by weight of phosphorus, 3 to 10% by weight of graphite, and at least 36% by weight of copper.

* * * * *